United States Patent [19]
Röder

[11] Patent Number: 4,465,919
[45] Date of Patent: Aug. 14, 1984

[54] CUTTING APPARATUS FOR THREE-DIMENSIONAL MOULDINGS

[76] Inventor: Walter Röder, Vilbeler Landstrasse 41, 6000 Frankfurt, Fed. Rep. of Germany

[21] Appl. No.: 245,340

[22] Filed: Mar. 19, 1981

[30] Foreign Application Priority Data

Mar. 24, 1980 [DE] Fed. Rep. of Germany ....... 3011244

[51] Int. Cl.³ .............................................. B23K 9/00
[52] U.S. Cl. ...................... 219/121 LG; 219/121 L; 219/121 LU; 219/121 LY
[58] Field of Search .................. 219/121, 69 E, 69 M; 264/154, 25; 425/174.4

[56] References Cited

U.S. PATENT DOCUMENTS

| | | | |
|---|---|---|---|
| 3,035,151 | 5/1962 | Weglarz | 219/69 E |
| 3,431,389 | 3/1969 | Tudor et al. | 219/69 M |
| 3,469,076 | 9/1969 | Saslawsky | 219/121 LG |
| 3,612,814 | 10/1971 | Houldcroft | 219/121 LG |
| 4,144,888 | 3/1979 | Malyshev et al. | 219/121 L |

FOREIGN PATENT DOCUMENTS 2400897 7/1975 Fed. Rep. of Germany .

OTHER PUBLICATIONS

Economic Cutting with $CO_2$-Lasers; (Messer Griesheim GmbH, Welding Products Division; Frankfurt/Main) Reprint from "Schweissen & Schneiden", vol. 3/75, published by DVS-Verlag Duesseldorf, (Mar. 1975).

*Primary Examiner*—B. A. Reynolds
*Assistant Examiner*—Catherine M. Sigda
*Attorney, Agent, or Firm*—W. G. Fasse; D. H. Kane, Jr.

[57] ABSTRACT

The present apparatus for trimming the edges and for cutting holes into three-dimensional hollow work pieces comprises few components and may be easily modified or retooled for use on molded work pieces of different shapes and sizes. For this purpose, the apparatus comprises a support mold 1 having a shape complementary to the shape of the work piece. The support mold is exchangeable and receives or holds the work piece in a form locking manner. The support mold comprises slots 4 or apertures 6 located where the trimming or cutting is to take place in the work piece. A laser cutting device 20 is arranged for cooperation with the support mold 1 in such a way that a relative motion may be performed between the laser cutting device and the support mold. Thus, the cutting laser beam is effective along the slots and along the edges of an aperture.

12 Claims, 12 Drawing Figures

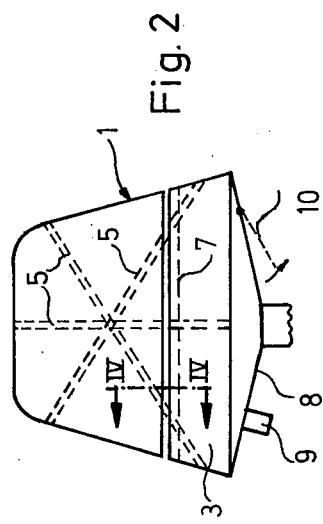
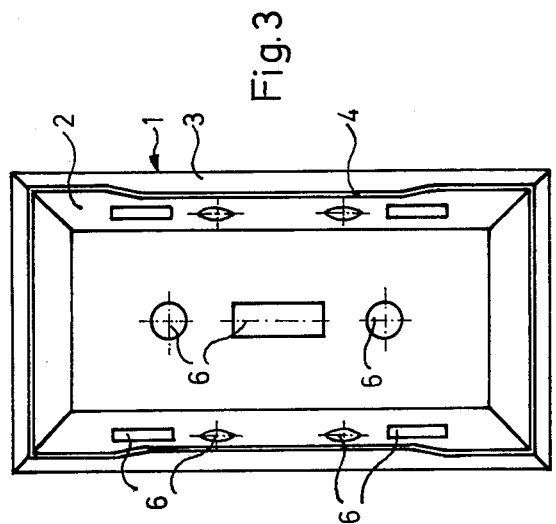
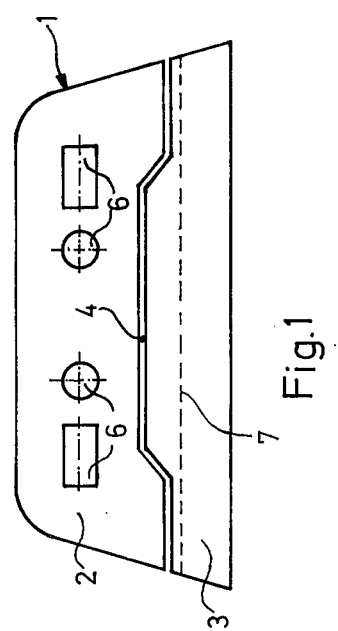
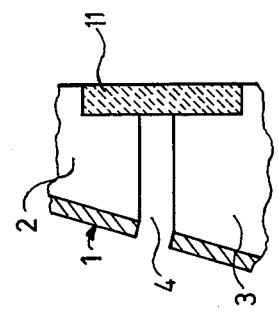

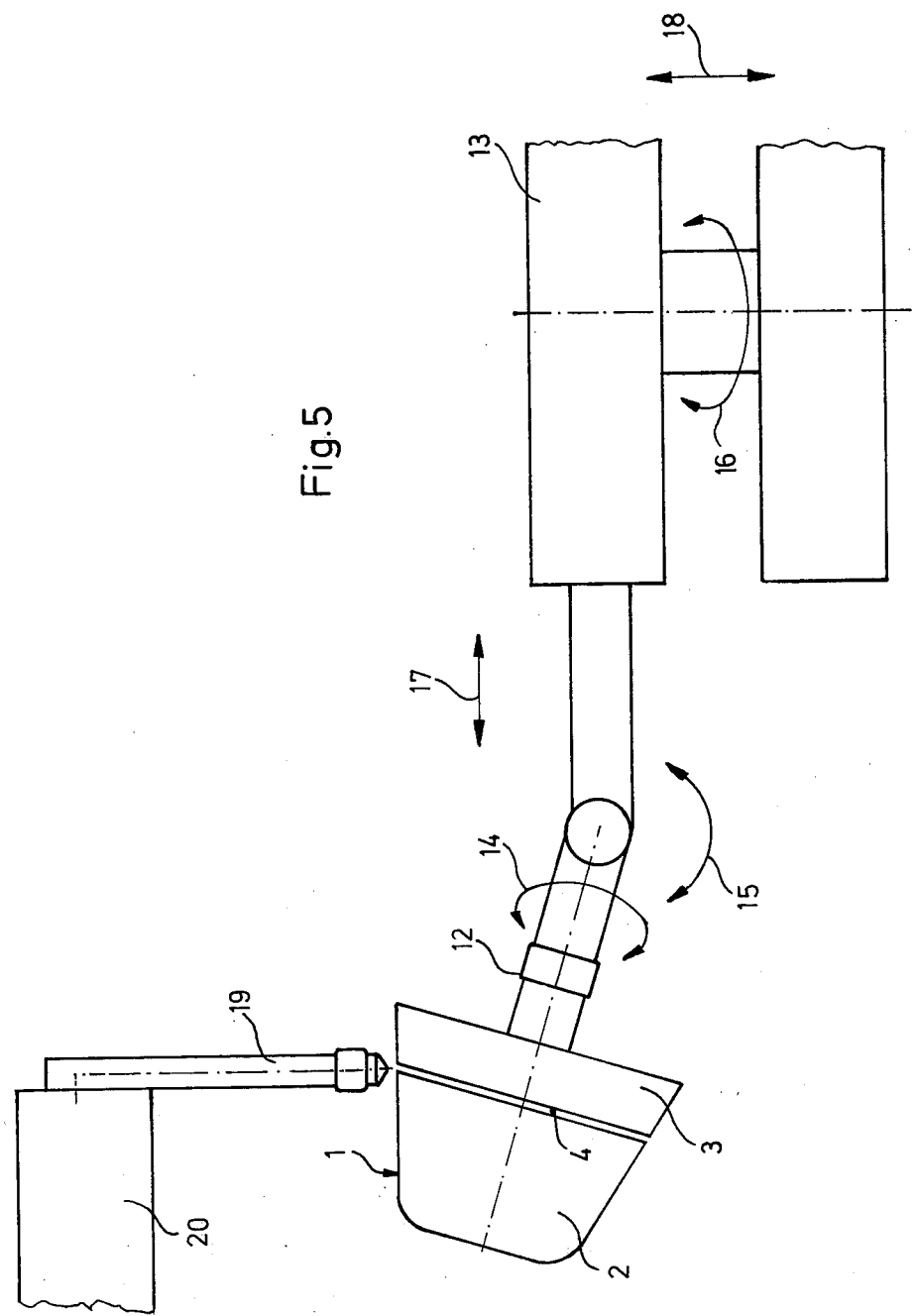

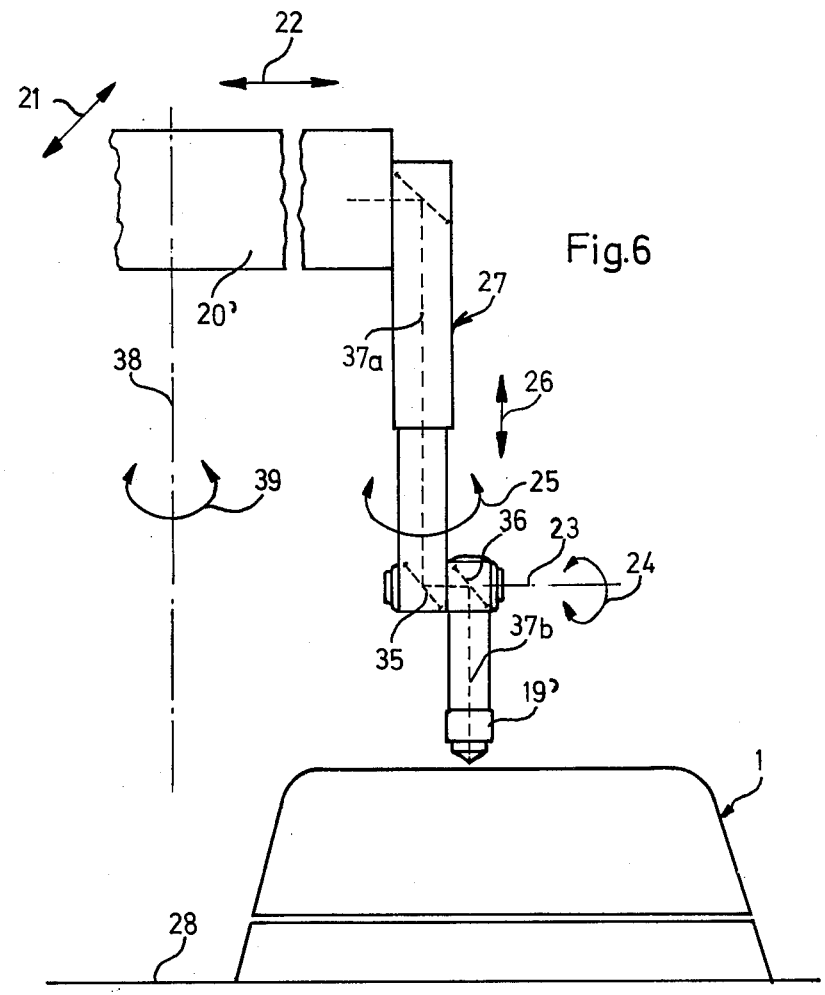

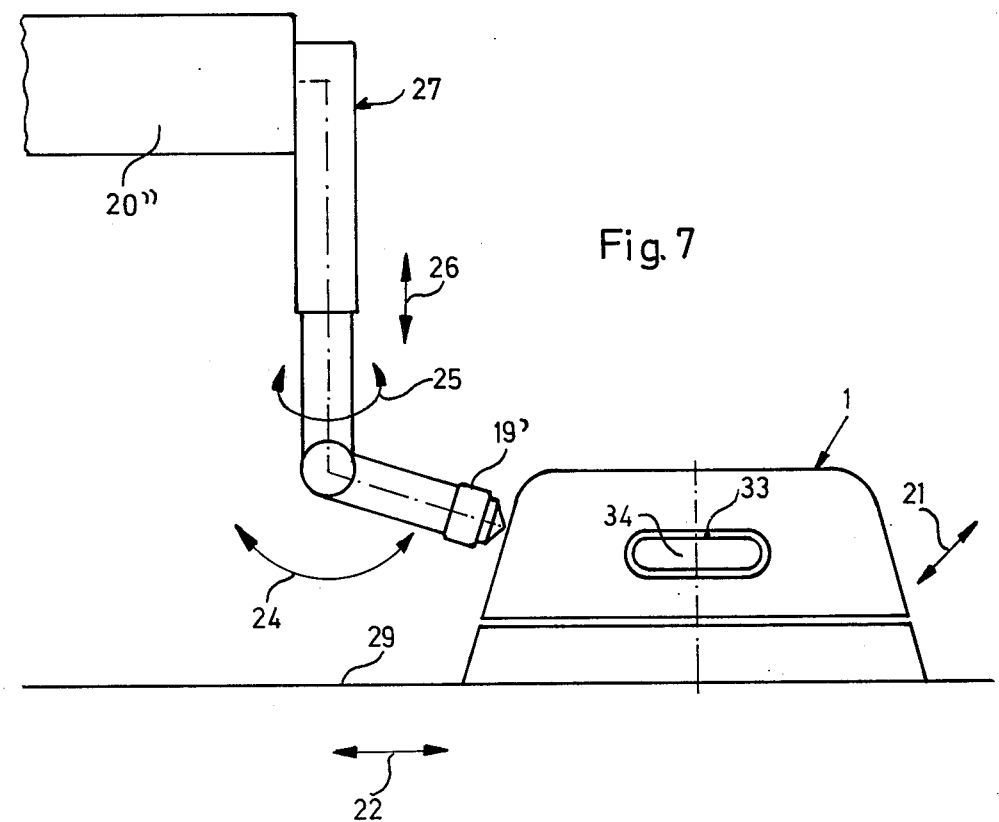

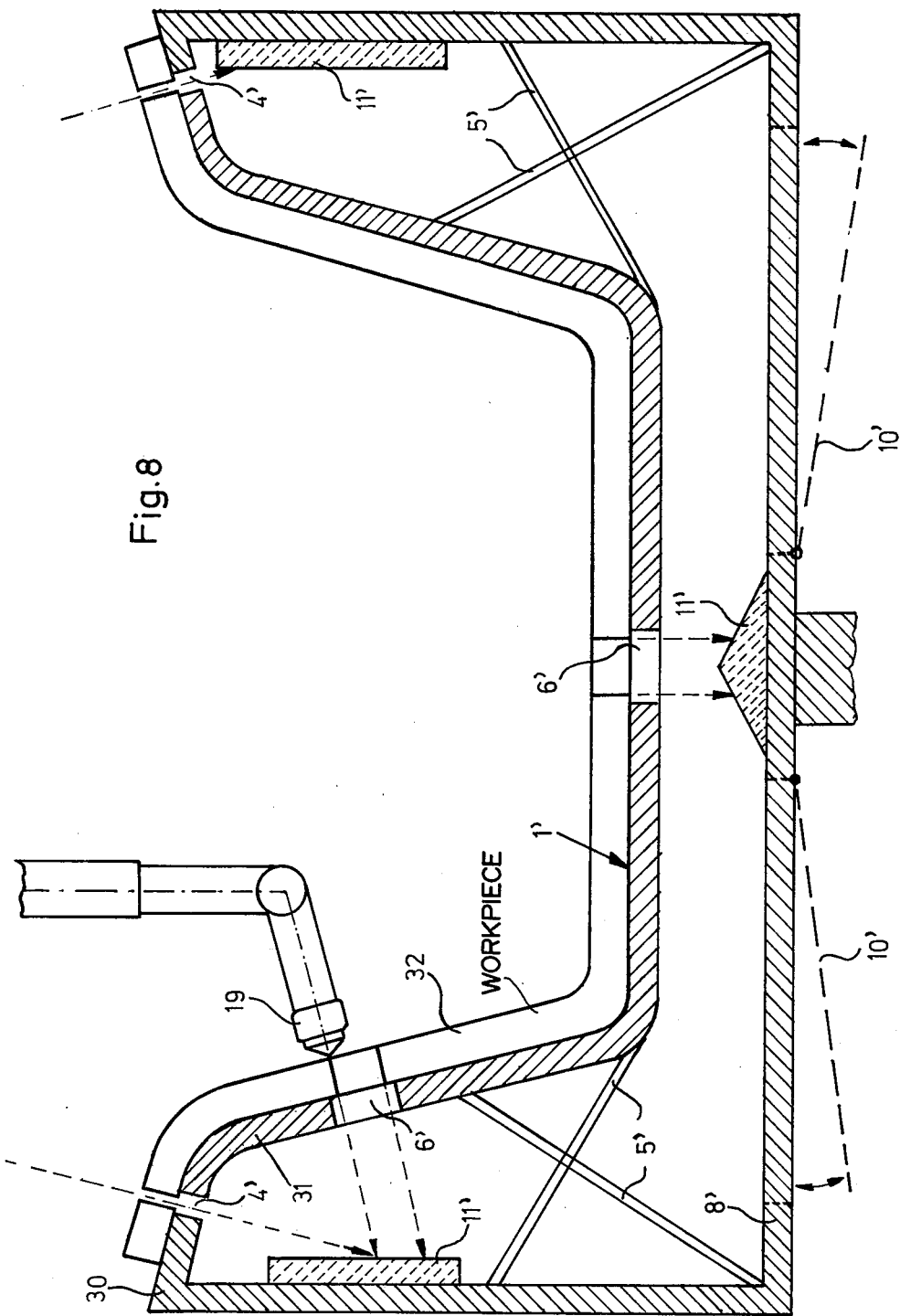

CUTTING APPARATUS FOR THREE-DIMENSIONAL MOULDINGS

BACKGROUND OF THE INVENTION

The invention relates to an apparatus for trimming the edges of and for making apertures in three-dimensional hollow work pieces such as moldings.

Such apparatuses are used for making cuts in planes set at an angle to one another, such as occur typically in synthetic plastics moldings for motor vehicles, for example instrument panels, headlining parts, floor and boot carpets, propeller shaft tunnel cladding and the like. In such cases, it becomes necessary to make in the relatively thin molded members which extend in three dimensions both complicated three-dimensional marginal cuts along the edges as well as to cut out apertures in the surfaces of three-dimensional work pieces which may have an irregular shape. The cuts do not need to be made purely at a right-angle to the surface of the moldings or perpendicular to the tangent in the case of curved wall zones, but may also extend obliquely to the wall of the molding. The terms work piece and molding are used interchangeably herein. Since moldings of this type are regularly mass produced moldings, the cuts cannot be made by hand but have to be carried out by machine.

In the case of a known cutting apparatus (DE-AS No. 24 00 897) a plurality of heatable cutting elements are provided which are adapted to be moved as required by a piston-cylinder arrangement, the piston-cylinder arrangements being disposed in a manner which suits the shape of the molding. The cutting lines are in each case sub-divided into a plurality of individual cuts. Therefore, this known cutting apparatus consists of a large number of component parts which have to be aligned relative one another with considerable effort and great accuracy. Furthermore, the parts of the apparatus are adapted to the shape of only one single molding, so that for every differently constructed or rather differently shaped moulding it is necessary to use a completely different cutting apparatus of correspondingly complicated construction.

OBJECT OF THE INVENTION

In contrast, the invention aims at solving the problem of providing a cutting apparatus of the type described at the outset but which requires but a few component parts and which can be converted easily to cut or trim molding of any desired shape and size, by using a laser beam for the cutting or trimming and by providing a relative movement between the laser beam and the work piece in the three coordinates of space.

SUMMARY OF THE INVENTION

According to the invention, the above objective has been achieved by a hollow interchangeable backing mold complementary to the hollow molding or work piece for positively receiving the work piece. At the locations of the edges to be trimmed and the apertures to be cut, the backing mold, is provided with continuous slots or corresponding apertures. A laser cutting device is asociated with the backing mold so that the backing mold and laser beam head are movable relative to each other along the slots and/or along the aperture edges of the backing mold in the three coordinates of space.

The apparatus according to the invention comprises only one cutting element, namely a laser cutting head, which generates the laser beam to move along the slots and, if applicable, along the aperture edges to trim accurate, even and fibre-free cut edges, on the molding. While this is happening, the laser beam penetrates the thickness of the material of the molding and passes through the slots or apertures in the backing mold which has a close fit as its supports the molding. For conversion to a different molding, it is necessary only to change the backing mold and to correspondingly adjust the system which controls the relative three-dimensional movements between a molding and laser cutting device, to the cutting pattern or to the slot pattern or the location of cut-outs. The backing mold may be either substantially convex with the molding fitted exactly over it, or it may be concave, i.e. of trough-shaped form for accurately surrounding a molding.

In order to impart the necessary shape, that is dimensional stability to the backing mold which is sub-divided by slots through which the molding edges can be trimmed, the parts of the backing mold which are separated by the slots, are rigidly connected on the side remote from the laser beam head, to one another by means of bridging elements located out of the reach of the laser beam.

For the invention it is furthermore important that the slots and, if applicable, the apertures in the backing mold, on the side remote from the laser beam head, are covered by laser-proof shield elements which are fixed to and at a distance from the wall of the backing mold. These shield elements ensure that the depth of penetration of the laser beam into the backing mold is limited and that the laser beam is arrested before it can strike any structural elements.

It is advantageous for the backing mold to form a closed chamber which is interrupted only by slots and, if applicable, by the apertures. The backing mold is preferably made of any one or more of the following materials: wood, synthetic plastics material, asbestos, metal and combinations of these materials. The backing mold may, however, also be expediently made of a wall having a lattice structure or the like, for example a steel wire mesh.

In order to carry away gases and vapours arising during the laser cutting, it is advantageous for the bottom of the backing mold to be closed by a wall to which a suction device is attached.

The backing mold and/or the laser beam head may be disposed for controlled preferably program-controlled three-dimensional relative movement. In this respect, it is possible to move the backing mold under the fixed laser beam head, according to the cutting pattern and at an angle determined by the desired cutting edge, or to guide the laser beam head according to the desired cutting edge while the backing mold remains stationary. The patterns of movement required to produce the three-dimensional relative movement may however also be divided between the laser beam head and the backing mold. For example, the laser beam head may be guided in telescopic fashion and in a vertical direction, rotatable about the telescope axis and in the desired variable oblique position while the laser cutting set remains fixed, whereas the backing mold may be mounted on a table which can be moved in all the directions contained in one plane. Therefore, the laser beam head has in this case three degrees of freedom of movement while the backing mold has two degrees of freedom of movement, so that altogether there are five degrees of freedom of movement which make it possible to reach any point on the backing mold or on the molding or work piece.

In a preferred embodiment, the backing mold is mounted on the working end of a freely programmable operating unit having five degrees of freedom of movement while the laser beam head is rigidly disposed. Such operating units, referred to as industrial robots, are commercially available equipment and by virtue of their free programmability and their extreme mobility can perform cutting patterns on moldings of every conceivable type. For conversion to different moldings, it is necessary merely to change the backing mold and the program which controls the movements relative to the laser cutting head. The programs can also be rapidly modified if this necessitates corresponding changes in the molds. Alternatively, the laser cutting device may be so constructed that its laser beam head can be moved as a freely programmable operating unit while the backing mold is held in a stationary position.

The hollow backing mold does not necessarily have to be constructed as a closed hollow body which, by reason of the encircling slot provided for trmming the edge of the molding, comprises two parts connected to each other by internal bracing members. Instead, according to a modified embodiment of the invention, the arrangement may be such that the support mold and the laser beam head can be moved relative to each other along the outer edge of the support mold for trimming the edges of the molding. With this embodiment, the support mold has more or less the form of an open shell, whereby the outer edge of the shell follows substantially the course of the edge of the molding which it to be trimmed. The thus constructed simple apparatus may, in order to create the aforesaid relative movement, be mounted with its backing mold on the working end of a freely programmable operating unit, while the laser beam head is held in a stationary position. However, a reversed disposition of the elements may be used in that for movement of its laser beam head, the laser cutting device is constructed as a freely programmable operating unit while the backing mold remains stationary. The sub-division of degrees of freedom of movement between a backing mould support and the laser cuttng device is likewise feasible.

According to a further embodiment of the invention, a blank holder having a shape corresponding to that of the backing mold cooperates with the backing mold, whereby the molding or work piece is positively sandwiched between the backing mold and the blank holder. This embodiment is advantageously used wherever it is necessary to trim molding made of dimensionally unstable materials which do not retain their shape. Since sandwiching occurs between the backing mold and the correspondingly shaped blank holder, such unstable moldings acquire excellent form or dimensional stability so that their edges can be trimmed while dish-like open backing molds are used.

The molding which is to be trimmed and the blank holder can be mounted in various ways. It is convenient for the backing mold the molding and the blank holder to be held together by means of suction devices. Such holdings together may however also be effected by suitable electromagnets or by other mechanical fixing means.

With advantage, an arrangement may be made whereby the blank holder can be pressed by the working end of an operating unit against the moldings which is held by the backing mold. If the subassembly comprising the backing mold, the molding held and the blank holder are moved relative to the fixed laser beam head, then the operating means which on the one hand engage the backing mold and on the other hand engage the blank holder, perform synchronised movements so that with the molding sandwiched between the backing mold and the blank holder, the pressure applied is retained throughout the full cycle of movements.

When a dish-shaped open backing mold and possibly a correspondingly shaped blank holder are used, the arrangement is expediently such that the laser beam head remains fixed while the backing mold is movable by an operating unit. An adjustable vacuum or suction pipe is disposed opposite the laser beam head. By means of the vacuum or suction pipe, which can be made of a laser-resistant material, the laser cutting vapours can be drawn off despite the fact that the backing mold is open.

The cutting apparatus according to the invention is suitable for any material which can be cut by a laser beam and which material has a thickness within the cutting capacity of the laser beams. If the apparatus according to the invention is being used for moldings for motor vehicles, then predominantly synthetic plastics materials must be cut or trimmed, including foamed plastics and synthetic carpets. These moldings have no cut-outs and are poured or injection molded with inaccurate outer edges and have to be trimmed three-dimensionally in accordance with the exact shapes they have to fit. In all cases, when the cutting apparatus according to the invention is used, it is possible to create accurate, even and fibre-free cuts which can be reproduced at will, if necessary also on shaped sheet metal components.

BRIEF FIGURE DESCRIPTION

The invention will be explained in greater detail, by way of example, with reference to the accompanying drawings which diagrammatically illustrate the invention. In the drawings:

FIG. 1 is a front view of a backing mold;

FIG. 2 is a side view of the backing mold shown in FIG. 1;

FIG. 3 is a plan view of the backing mold shown in FIGS. 1 and 2;

FIG. 4 is a broken-away section through the backing mold taken on the line IV—IV in FIG. 2;

FIG. 5 is a backing mold mounted on an industrial robot opposite a fixed laser cutting device;

FIG. 6 is a movable laser cutting device with a rigidly disposed backing mold;

FIG. 7 is a movable laser cutting device with a movable backing mold,

FIG. 8 is a section through a trough-shaped backing mold with a molding or work piece inserted in it and also the laser beam head.

Figure 10:
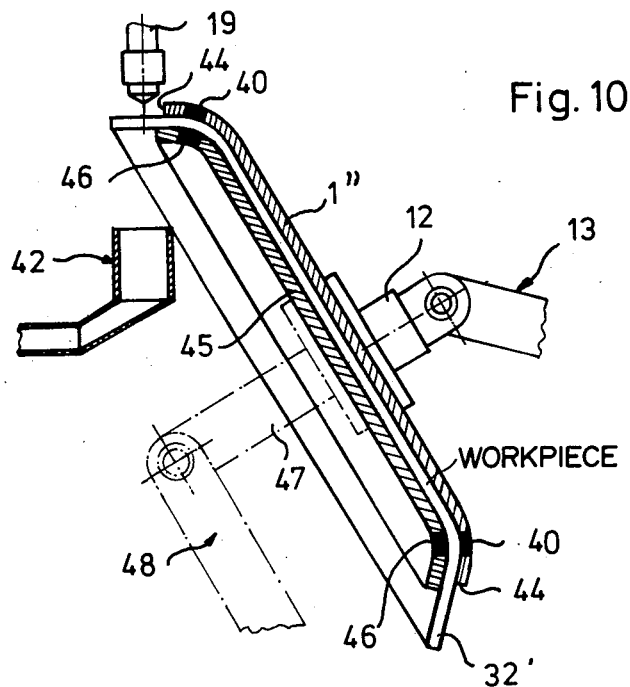
FIG. 10 is a sectional view similar to that in FIG. 9 with an additionally disposed blank holder.

DETAILED DESCRIPTION OF PREFERRED EXAMPLE EMBODIMENTS AND OF THE BEST MODE OF THE INVENTION

The convexly hollow backing mould 1 shown in FIGS. 1 to 3 and intended for positively receiving a trough-shaped (not shown) molding or work piece comprises an upper portion 2 and a lower portion 3, which are separated from each other by a continuous and encircling slot 4 through which the edge of the molding can be trimmed off along a path extending three-dimensionally in space. A plurality of struts 5 form bridging elements for rigidly connecting the two parts 2 and 3, are indicated by broken lines in FIG. 2. The backing mold may be formed of any suitable shape-retaining material, for example synthetic plastics material or it may be cast of metal, for example aluminium.

In addition to the slots 4 extending in various directions in space there are other differrently shaped apertures 6 in the upper portion 2 of the backing mold. The dashed line 7 on the bottom portion 3 in FIGS. 1 and 2 more or less marks the untrimmed margin of the molding or work piece which is to be fitted over the backing mold 1. At the bottom end of the backing mold, there is in FIG. 2 a wall 8 which closes off the bottom of the backing mold. Fixed to this wall is a connector 9 which communicates with the cavity inside the backing mold and which makes it possible to evacuate gases and vapours which arise during laser cutting. Furthermore, it is possible to provide in the wall a flap 10 for removal of waste which drops into the cavity during cutting of the apertures 6.

In some suitable manner, not shown, the backing mold 1 is fixed on a frame of the apparatus (not shown) or a table or the like movably mounted on the apparatus frame, in a position in which it is opposite the laser cutting device. The backing mold can however be mounted at the working end of an industrial robot as will be described with reference to FIG. 5.

As FIG. 4 shows, a laser-resistant shield element 11, for example made of asbestos or of a fire clay material, is mounted in the cavity in the backing mold 1, at a distance from the wall thereof. The shield element 11 which follows the full length of the slot 4 is fixed in the cavity in some suitable manner, for example by means of the bridging element or struts 5 or the like which rigidly connect the top and bottom parts 2, 3 to each other. The shield element 11 can however also be itself constructed as a bridging element. Corresponding shield elements are also situated opposite the apertures 6.

In FIG. 5, the backing mold 1 is mounted on the working end 12 of an industrial robot generally designated at 13, which performs of rotary movements indicated by arrows 14, 15, 16 about three axes and translatory movements indicated by arrows 17, 18 in two directional axes, and which therefore has a total of five degrees of freedom of movement. By means of these combined movement opportunities, any point on the surface of the backing mold 1 or on the molding which is fitted over it can be exposed to the fixed laser beam head 19 of the stationary laser cutting device 20 which is disposed in a specific location in relation to the industrial robot 13.

The embodiment shown in FIG. 6 comprises a laser cutting device 20' which can be moved in all directions in on plane as indicated by arrows 21, 22 and a backing mold 1 disposed in a stationary position on a table 28. The laser beam head 19' is located at the end of a rotatable (arrow 25) variable-length (arrow 26) telescopic device 27 so as to be pivotable (arrow 24) through 270° or more about the axis 23, so that this device also provides five degrees of freedom of movement which are represented by the arrows 21, 22, 24, 25 and 26 thereby making it possible to reach any point on the backing mold or molding.

The relative movements in space are also provided by the embodiment shown in FIG. 7. In this case, a telescoping device 27 is located on the fixed laser cutting device 20''. The device 27 has a variable length (arrow 26) and is rotatable (arrow 25). Telescoping device 27 carries at its lower end a laser beam head 19' pivotable through 270° or more (arrow 24). The backing mould 1 is located on a support carriage 29 adapted for movement in all directions in one plane (arrow 21, 22) on a table (not shown). In this way there are also five degrees of freedom of movement for covering any point on the three-dimensional surface of the molding.

In all the possible forms of embodiment of the apparatus, a once-traced follow-up control system which has a memory capacity is preferred and such control system can also switch the laser beam on and off. In each case the finished molding is moved to the discharge position by the control system so that the backing mold can be provided with a fresh molded blank or work piece. A computer-programmed feed system is also possible. The slots 4 provided for passage of the laser beam through the walls of the backing mold and also the cut-outs 6 can be already cut into the backing mold with the controlled laser beam if the material used for the backing mold is such that it can be cut by a laser beam.

All embodiments may be provided with a sliding or rotating table or in the case of the embodiment according to FIG. 5 with a second industrial robot so that when the cut moldings are removed and untrimmed moldings are placed in position, two backing molds can be used alternately to load the laser cutting device.

The backing mold 1' shown in FIG. 8 has an outer part 30 and an inner part 31 which are separated from each other by a continuous and encircling slot 4' and which jointly form a trough-shaped backing mold intended to receive a moulding or work piece 32. Once again, struts 5' are provided to act as bridging elements. Opposite the slot 4, and if applicable opposite the apertures 6', there is arranged a laser beam resistant shield element 11'. Otherwise, the backing mold 1' corresponds in its construction and location on the entire apparatus, to that described with reference to FIGS. 1 to 4. In this case the backing mold is also closed at the bottom by a wall 8' which makes it possible to connect a suction fan and to provide removal flaps for waste removal.

In all the various embodiments of the backing mold, it is possible to provide additionally suitable mechanical means for positive attachment of the mouldings. Even holding of the molding to on the backing mold by suction, for example by employing a gas and vapour suction device may be feasible.

Instead of the full apertures 6 described, it is also possible to provide an encircling slot 33 (FIG. 7) which corresponds to the aperture edges, the panel 34 encircled by the slot 33 being fixed from the inside, i.e. from the cavity of the backing mold 1, by struts or the like (not shown), whereby the panel 34 cut out of the molding cannot fall into the cavity in the backing mold.

In FIGS. 6 and 7, deflection of the laser beam is required at its transition from the telescopic device 27 into the laser beam head 19'. The construction of the apparatus for this purpose is described with reference to FIG. 6. Deflection takes place at a pair of mirrors 35, 36 of which one mirror 35 is rigidly disposed in the free end of the telescopic device 27 at the point of intersection of the laser beam 37a in the telescopic device with the axis 23, at an angle of 45° to the axis 23, while the other mirror 36 is disposed at the point of intersection of the axis 23 with the laser beam 37b in the laser beam head 19', likewise at an angle of 45° to the axis 23 so that the mirror 36 is rigid in the laser beam head but is able to pivot or rotate with the laser beam head about the axis 23 which extends through the middle of both mirrors 35, 36. By reason of this arrangement, the laser beam 37a which passes in a vertical direction through the telescopic device 27 is deflected through 90° at the mirror 35 so that, coincident with the axis 23, it extends initially horizontally until it is deflected at the mirror 36, likewise through 90°, after which the laser beam passes with its pivotable course or leg 37b through the laser beam head 19'. The described deflection of the laser beam is retained in all pivoted positions of the laser beam head 19'.

In the embodiment of FIG. 6, a preferred modification of the laser beam cutting device 20' may reside in that instead of the linear mobility of the laser cutting device which is possible in the direction of the arrow 21, the laser cutting device is adapted to pivot about the vertical axis 38 in the direction of the arrow 39 indicated by the dash-dotted line in FIG. 6. In the case of this preferred modified embodiment of the laser cutting device, its movement and control characteristics substantially correspond to those of an industrial robot.

The linear mobility of the laser cutting device in the direction of the arrow 22 in FIG. 6 can occur either by reason of movement of the entire laser cutting device 20' or by a telescopic construction of the upper transverse part of the laser cutting device 20'.

Figure 9:
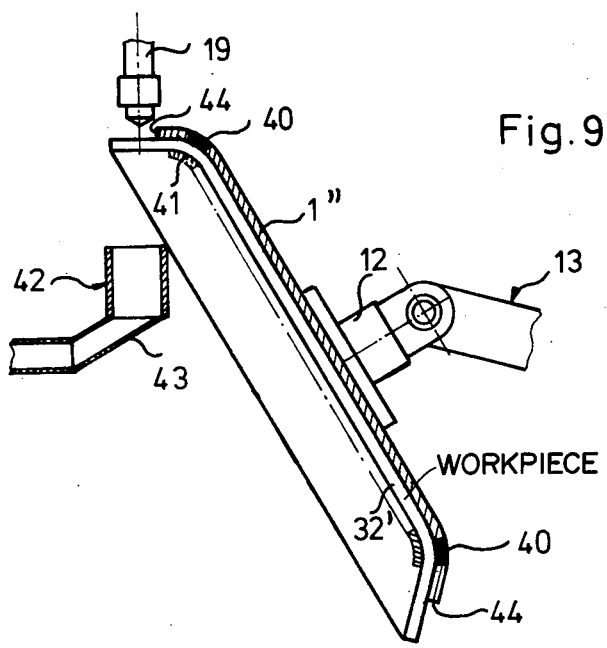
FIG. 9 is a sectional view through a dish-shaped open backing mold holding a molding thereon and fitted on the working end of an operating unit.

FIG. 9 shows a further embodiment of the apparatus in which a dish-shaped open backing mold 1" is mounted on the working end 12 of shown in broken-away fashion of an industrial robot 13 which has the five degrees of freedom of movement explained in greater detail below. The molding 32' inserted into the backing mold 1" is held in its position by a plurality of fixing elements 40 provided on the periphery of the backing mold 1". If the molding 32' is made of a material which can be magnetised, then the fixing elements 40 may be constructed as electromagnets. In the case of molding which are made of non-magnetisable material, the fixing elements 40 are suction devices. It is however also possible for molding 32' which are made of non-magnetisable material to be held by electromagnets if, with the molding sandwiched in between, magnetisable metal elements are incorporated into the molding 32' opposite the electromagnets. Such metal elements may for example take the form of a steel ring 41 opposite the fixing elements 40 and indicated in FIG. 9 by dash-dotted lines. This steel ring 41 is held in its position by the fixing elements 40 which are constructed as electromagnets and thus hold the moulding 32' rigid in the backing mold 1". An adjustable suction pipe 42 is arranged opposite the rigidly disposed laser beam head 19 for removing laser cutting vapours. At least the wall 43 which the laser beam strikes is made of a laser beam resistant material.

As FIG. 9 illustrates, the edge of that the molding 32 is trimmed along the outer edge 44 of the backing mould 1".

The apparatus shown in FIG. 10 has substantially the same construction as was described with reference to FIG. 9. In addition, however, a blank holder 45 is provided which matches the shape of the backing mold 1" so that the molding 32' is sandwiched between the portions 1" and 45 of the apparatus. The holder 45 and the backing mold 1" are constructed as shell-shaped supports. If the blank holder 45 is made of a magnetisable material, the holder in turn may be held in its position by fixing elements 40 which are constructed as electromagnets. If holder 45 is not made of a magnetisable material, however, it is possible to provide at locations opposite the fixing elements 40 plates or the like 46 which are made of a magnetisable material and incorporated into the blank holder. However, the fixing elements 40 can also be constructed as suction devices as has been described with reference to FIG. 9. In this case, the plates 46 are similarly corresponding suction elements.

Alternatively or in addition to the fixing elements 40 and to the plates 46, the blank holder 45 may also be mounted on the working end 47 of an operating unit 48 which has five degrees of freedom of movement. The working end 47 and the industrial robot 48 are shown by dash-dotted lines in FIG. 10. Where the movement of the backing mold 1" and of the blank holder 45 is concerned, there must be complete synchronisation of movements between the industrial robots 13 and 48 so that in each phase of the movement the molding 32' is sandwiched rigidly between the backing mold 1" and the blank holder 45. The industrial robot 48 may be an assembly separate from the industrial robot 13 but it is also possible instead of the industrial robot 48 to use a second operating arm articulated on the industrial robot 13. In either case, for generation of an exact programmed cycle of movement, it is necessary for both the working end 12 and also, if applicable, the working end 47, to be mounted on the backing mold 1" or on the blank holder 45 in an accurately defined position.

In the case of the disposition shown is FIG. 10, it is also possible for the blank holder 45 to function as the backing mold while the backing mold 1" acts as a blank holder.

Figure 11:
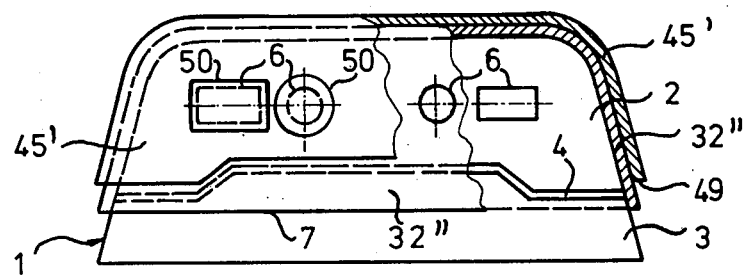
FIG. 11 is a front view of a backing mold similar to that in FIG. 1, with the molding which is to be trimmed, fitted onto it and with a blank holder applied thereto.

The convexly curved backing mold 1 shown in FIG. 11 corresponds to that of FIG. 1 and has a hollow upper part 2 and the lower part 3. Such backing mold cooperates with a correspondingly shaped blank holder 45', so that the molding 32" or work piece is held rigidly sandwiched between the backing mold 1 and the blank holder 45'. If fitting of the blank holder 45' is necessary, then this can take place in the manner described with reference to FIGS. 9 and 10.

The blank holder 45' is so constructed that its marginal edge 49 ends in front of the continuous and encircling slot 4 provided in the backing mold 1 for margin trimming. At the locations of the apertures 6 provided in the backing mold 1, the blank holder 45' is provided with corresponding but somewhat larger apertures 50 so that it is possible for the laser to cut out corresponding apertures in the molding 32".

Figure 12:
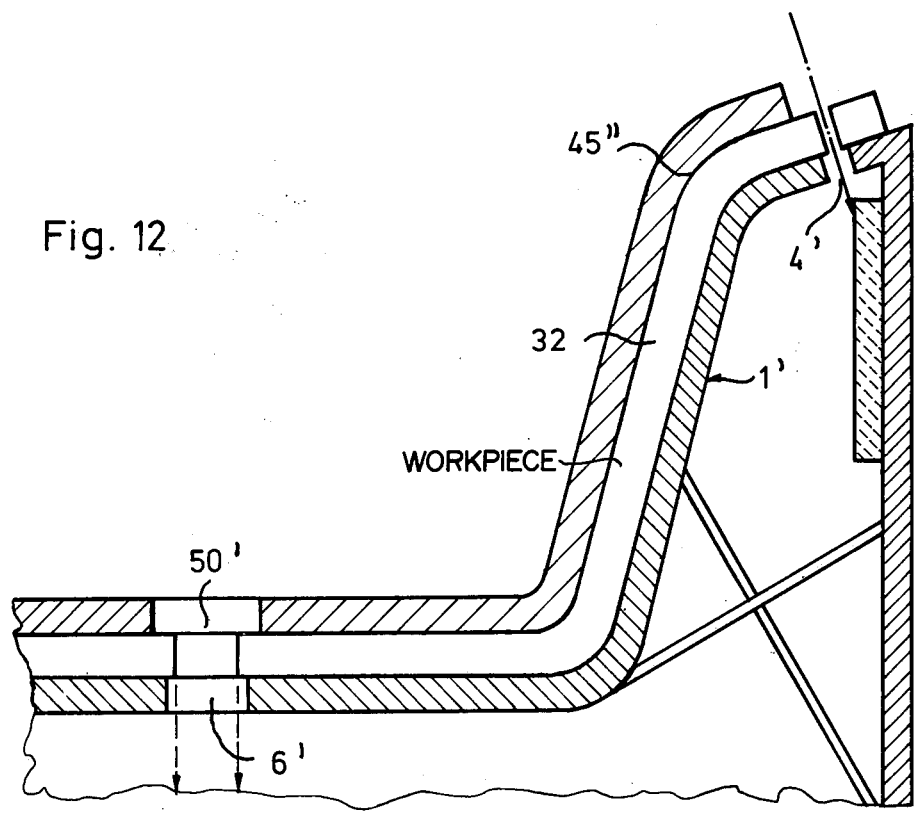
FIG. 12 is a cross-section similar to that in FIG. 8 with a molding inserted and held between a blank holder and a backing mold.

In the case of the backing mold 1' shown in FIG. 8, a blank holder 45" may also be used, as FIG. 12 shows. In this case the blank holder 45" has a shape which complements that of the backing mold 1', so that the molding 32 is rigidly gripped. The outer edge of the blank holder 45" in turn ends in front of the encircling slot 4'. A larger sized aperture 50' in the blank holder 45" is provided opposite the aperture 6' in the backing mold 1'. If necessary, the blank holder 45" in this embodiment may be mounted or applied under pressure in the manner described with reference to FIGS. 9 and 10.

The blank holders 45, 45' and 45" may be formed of the same material as the respective backing mold, for example those components may be made of a glass fibre reinforced synthetic plastics material.

Although the invention has been described with reference to specific example embodiments it will be appreciated that it is intended to cover all modifications and equivalents within the scope of the appended claims.

I claim:

1. A laser beam cutting apparatus for cutting three-dimensional work pieces, comprising hollow exchangeable backing molding means shaped to correspond to the shape of a three-dimensional work piece for holding the work piece in a form locking manner, at least one opening forming an uninterrupted slot or aperture extending three-dimensionally in said backing molding means, laser beam generating means including a laser beam head located to face a work piece held by the backing molding means, movement providing means operatively arranged for providing a relative three-dimensionally effective movement between said laser beam head and said backing molding means, and laser beam shielding means located substantially in alignment with said opening with regard to the direction of a laser beam, said shielding means being spaced from said opening in said backing molding means opposite said laser beam head.

2. The apparatus of claim 1, wherein said backing molding means comprise two components spaced by said uninterrupted slot, and bridging means operatively interconnecting said backing components opposite said laser beam head in positions substantially out of the reach of a laser beam.

3. The apparatus of claim 1, wherein said backing molding means have a completely closed three-dimensional surface, except for said slot or aperture, said three-dimensional surface being made of a dimensionally substantially stable material.

4. The apparatus of claim 1, wherein said backing molding means have a lattice structure interrupted by said slot or aperture.

5. The apparatus of claim 1, wherein said backing molding means enclose a three-dimensional hollow space interrupted at its surface by said slot or aperture, said apparatus further comprising suction means (9) operatively connected to said hollow space for exhausting vapors resulting from a laser beam cutting operation.

6. The apparatus of claim 1, wherein said relative movement providing means are programmable in their three-dimensional movement.

7. The apparatus of claim 1, further comprising programmable operating means including an operating arm constituting said relative movement providing means and having five degrees of freedom of three-dimensional movement, said backing molding means being secured to said operating arm for three-dimensional movement with the operating arm, and wherein said laser beam head is stationary.

8. The apparatus of claim 1, wherein said relative movement providing means comprise movement programmable movable operating means, said laser beam head being secured to said movable operating means for three-dimensional movement with the operating means, and wherein said backing molding means is stationary.

9. The apparatus of claim 1, wherein an aperture in said backing molding means and an insert (34) in said aperture define an endless slot in said backing molding means, and struts for holding said insert (34) in said aperture.

10. The apparatus of claim 1, wherein said laser beam generating means comprise telescoping means (27) adjustable in its length in the direction of a first telescoping axis and rotatable about the first telescoping axis (37a), said laser beam head being secured to a free end of said telescoping means for tilting about a second axis (23) extending perpendicularly to said telescoping axis, a first mirror (35) operatively arranged in a fixed position in the free end of said telescoping means for deflecting a laser beam from said telescoping means into said laser beam head, and a second mirror (36) located in a fixed position in said laser beam head for receiving a deflected laser beam and for further deflecting a received laser beam toward said opening, said first mirror extending at an angle of 45° to said first telescoping axis, said second mirror extending at an angle of 45° to said second axis about which said laser beam head is tiltable, said second mirror (36) being tiltable with the laser beam head, said second axis (23) extending through the center of both said mirrors (35, 36).

11. The apparatus of claim 1, further comprising holder means having a configuration substantially corresponding to that of said backing molding means and a work piece, for holding a work piece sandwiched between said holder means and said backing molding means.

12. The apparatus of claim 1, wherein said holder means has an edge extending substantially along said opening.

* * * * *

UNITED STATES PATENT AND TRADEMARK OFFICE
CERTIFICATE OF CORRECTION

PATENT NO. : 4,465,919

DATED : August 14, 1984

INVENTOR(S) : Walter Roeder

It is certified that error appears in the above-identified patent and that said Letters Patent is hereby corrected as shown below:

On the title page,
Replace the title to read: --A CUTTING APPARATUS FOR CUTTING THREE-DIMENSIONAL WORK PIECES WITH THE AID OF A LASER BEAM--.

In Claim 12, line 1, replace "claim 1" by --claim 11--.

Signed and Sealed this

Twenty-sixth Day of February 1985

[SEAL]

Attest:

DONALD J. QUIGG

Attesting Officer

Acting Commissioner of Patents and Trademarks